(12) United States Patent
Shepherd

(10) Patent No.: US 8,279,464 B2
(45) Date of Patent: Oct. 2, 2012

(54) METHOD AND SYSTEM FOR CLASSIFYING A JOB IN A PRODUCTION ENVIRONMENT

(75) Inventor: Michael David Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1567 days.

(21) Appl. No.: 11/736,797

(22) Filed: Apr. 18, 2007

(65) Prior Publication Data

US 2008/0259379 A1 Oct. 23, 2008

(51) Int. Cl.
*G06F 15/00* (2006.01)
(52) U.S. Cl. .................. 358/1.15; 358/1.13; 706/45
(58) Field of Classification Search .................. 358/1.15
See application file for complete search history.

(56) References Cited

U.S. PATENT DOCUMENTS

| | | | | |
|---|---|---|---|---|
| 5,499,366 A | * | 3/1996 | Rosenberg et al. ................. 1/1 |
| 7,064,848 B2 | * | 6/2006 | Jackson et al. ............... 358/1.13 |
| 7,243,303 B2 | | 7/2007 | Purvis et al. | |
| 7,454,397 B2 | * | 11/2008 | Ocke ............................. 706/47 |
| 2003/0189724 A1 | * | 10/2003 | Kloosterman et al. ....... 358/1.18 |
| 2003/0214671 A1 | * | 11/2003 | Bos et al. ..................... 358/1.15 |
| 2004/0193465 A1 | * | 9/2004 | Sangroniz et al. ............... 705/8 |
| 2006/0253213 A1 | | 11/2006 | Ocke et al. | |
| 2008/0239366 A1 | * | 10/2008 | Cyman et al. ............... 358/1.15 |

OTHER PUBLICATIONS

Horridge, Matthew et al. "A Practical Guide to Building OWL Ontologies Using The Protege-OWL Plugin and CO-ODE Tools" Edition 1.0, The University of Manchester, Aug. 27, 2004, pp. 39-64.

* cited by examiner

*Primary Examiner* — Marivelisse Santiago Cordero
*Assistant Examiner* — Kent Yip
(74) *Attorney, Agent, or Firm* — Fox Rothschild LLP

(57) ABSTRACT

A method and system for processing a job in a production environment includes a knowledge base containing multiple product intents. Each product intent includes parameter requirements and/or parameter restrictions for producing a finished product. The method and system receive a product description that includes desired properties of a proposed job, and use a semantic reasoning system to infer which of the product intents in the knowledge base corresponds to the product description.

17 Claims, 7 Drawing Sheets

METHOD AND SYSTEM FOR CLASSIFYING A JOB IN A PRODUCTION ENVIRONMENT

BACKGROUND

1. Technical Field

The present disclosure generally relates to systems and methods for implementing a production process workflow, such as a workflow in a document processing environment.

2. Background

Production environments may receive a wide variety of jobs from multiple customers or operators. Print-based management information systems (MIS), order entry systems, and creative applications have the ability to provide customer-level description of the final product, hereafter termed product description or product intent. Typically, different product intents have different production requirements. In some cases, a customer or operator must select a product type or category in order for the system to assign processing parameters to the product. However, a customer or operator may not always know the available product types or the specific parameters associated with each product. In other situations, a customer or operator may be required to select all of the processing parameters to define a workflow for a job. However, the customer or operator may not be familiar with each available resource in the production environment, so the customer or operator may overlook one or more processing steps when selecting the steps for a particular job.

The embodiments described herein relate to attempts to solve one or more of the problems described above.

SUMMARY

In an embodiments a method of processing a print job in a print shop includes maintaining a knowledge base that contains multiple product intents. Each product intent includes parameter requirements and/or parameter restrictions for a finished print job. The method also includes receiving a product description that includes multiple desired properties of a proposed print job. The method includes using a semantic reasoning system to infer which of the product intents in the knowledge base corresponds to the product description, and it also includes automatically identifying a workflow in a print shop for the proposed print job based on the inferred product intent. The method then processes the proposed print job in the print shop according to the identified workflow.

Optionally, for each product intent that includes at least one parameter requirement, the inferring may include determining that the product intent does not correspond to the product description if the product description does not include each included parameter requirement. For each product intent that includes at least one parameter restriction, the inferring may include determining that the product intent does not correspond to the product description if the product description includes a parameter that conflicts with any included parameter restriction. If the inferring comprises determining that more than one candidate product intent may equally correspond to the product description, the method also may include presenting each of the candidate product intents to a user, receiving a selected product intent out of the candidate product intents, and using the selected product intent as the inferred product intent. If the inferring determines that more than one candidate product intent may equally correspond to the product description, the method also may include (i) requesting additional product description from the user, where the product description and additional product description collectively make up an updated product description; and (ii) using a semantic reasoning system to infer which of the product intents in the knowledge base most closely corresponds to the updated product description. Before automatically identifying a workflow, the method also may include providing a user with the ability to override the inferred product intent with a user-selected product intent, and thereafter using the user-selected product intent as the inferred product intent.

Parameter requirements may include, for example, aspects such as binding type, cover type, or fold type. Parameter restrictions may include, for example, a print media type.

In an alternate embodiment, a method of processing a job in a production environment includes maintaining a knowledge base containing multiple product intents. Each product intent includes parameter requirements and/or parameter restrictions for producing a finished product. The method includes receiving a product description that includes desired properties of a proposed job, and using a semantic reasoning system to infer which of the product intents in the knowledge base corresponds to the product description. For each product intent that includes at least one parameter requirement, the inferring may include determining that the product intent does not correspond to the product description if the product description does not include each included parameter requirement. For each product intent that includes at least one parameter restriction, the inferring may include determining that the product intent does not correspond to the product description if the product description includes a parameter that conflicts with any included parameter restriction. The method also may include providing a user with the ability to override the inferred product intent with a user-selected product intent. If the user overrides the inferred product intent, then thereafter the method may use the user-selected product intent as the inferred product intent. The method also may automatically identify a workflow in a production environment for the proposed job based on the inferred product intent and process the proposed job in the production environment according to the determined workflow to create the finished product.

In an alternate embodiment, a print job classification system includes a knowledge base containing multiple product intents, wherein each product intent includes at least one of parameter requirements and parameter restrictions for a finished print job. The system also includes an automated reasoner that receives a product description with desired properties of a proposed print job and delivers inferences to determine which of the product intents in the knowledge base corresponds to the product description. The system also includes a logics interface that automatically identifies a workflow in a print shop for the proposed print job based on the inferred product intent. It also issues an order to process the proposed print job in the print shop according to the determined workflow.

DETAILED DESCRIPTION

Figure 1:
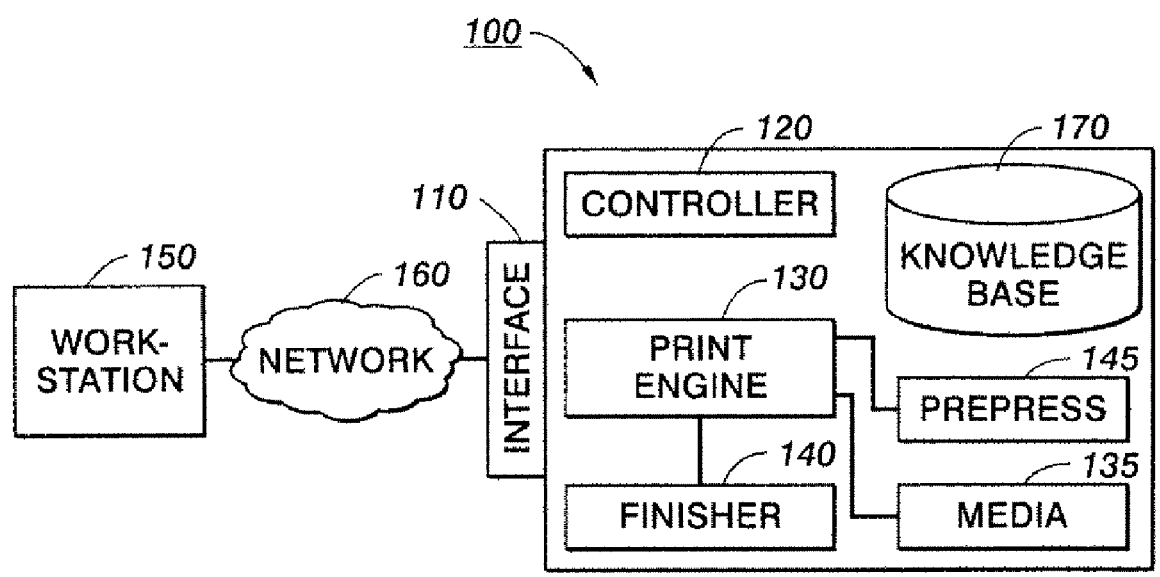
FIG. 1 illustrates exemplary elements of a production process system, in this case a printing environment.

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an" and "the" include plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

For purposes of the discussion below, the terms "print shop" and "printing environment" are interchangeably used to refer to a facility that contains multiple document production resources, such as printers, cutters, collators and the like. In a print shop, multiple document production devices are networked or configured to provide a document assembly environment within which documents can be printed, cut, finished, coated, bound, assembled, or otherwise created to form a variety of document types. A print shop may be a freestanding entity including one or more print-related devices, or it may be part of a corporation or other entity. Additionally, a print shop may communicate with one or more servers by way of a local area network or a wide area network, such as the Internet, the World Wide Web or the like.

The term "job" as used herein refers to a logical unit of work that is to be completed for a customer. A job includes the instructions and parameters pursuant to which an item is processed in a production environment. For example, in an assembly line environment, a "job" can refer to the set of materials selected, processes applied, process parameters, machines used, and other data required to determine how a product is produced or otherwise processed on all or part of the assembly line.

A "print job" refers to a job processed in a document production system. For example, a print job may include a set of commands to produce credit card statements corresponding to a certain credit card company, produce bank statements corresponding to a certain bank, print a document, or the like.

A "workflow" is a process that uses electronic systems to manage and monitor business processes, thus allowing the flow of work between individuals, devices and/or departments to be defined and tracked. A workflow can include the operational aspects of a work process, how tasks are structured, who or what device performs them, what is the relative order of various tasks, how tasks are synchronized, how information flows to support the tasks and how tasks are being tracked. In a print shop environment, a workflow can be used to describe the movement of a document through a process, as a workflow is a defined set of operations used to approve, verify, modify and/or otherwise process a document.

A "resource" is a machine that performs an operation. For example, a printing operation can be performed on a resource, such as a printer. Other exemplary resources include, without limitation, scanners, fax machines, cutting machines, binding machines, folding machines and the like. A resource may perform more than one operation for a particular job, such as a machine that folds and cuts paper, or a multi-function device that prints a document and also performs one or more finishing activities on the document, such as coating, cutting, sorting, binding, or other activities.

FIG. 1 illustrates components of a system 100 that may be used in accordance with carrying out the embodiments described herein. Although FIG. 1 illustrates a system in a printing environment, any production environment may be used in the embodiments described herein. A printing environment system 100 may include features such as a user interface 110, a print engine 130, and a controller 120 that controls the various resources within the system 100. The print engine 130 or other resources may have access to a media supply 135, which supplies paper or other material on which content is to be printed. The system 100 also may include one or more prepress services 145, including software or devices that perform image processing, document size selection or other features. The system 100 also may include one or more finishing services 140 including software or devices that perform sorting, cutting, finishing or other post-printing services. A user may access the system via a user interface 110 or, in some embodiments, a user workstation 150 which may include a stand-alone or portable computing or display device that is in communication with the system 100 via a communications network 160 such as a wired or wireless network. The workstation 150 and/or controller 120 may include or have access to a knowledge base 170 such as a database or other computer-readable memory. The workstation 150 could be an item or system such as a management information systems (MIS), order entry systems, and creative applications.

The knowledge base 170 is a computer-readable medium that includes information required for the processing of jobs on resources in the production environment. The knowledge base 170 may be considered to be a "semantic" knowledge base in that the data contained in the knowledge base is in the form of an ontology such as web ontology language (OWL), which is released by the World Wide Web Consortium, or another format that allows for the description of concepts, individuals and relationships between or among concepts and individuals. Jobs may be associated with one or more defined classes or subclasses in the knowledge base. A defined class is a set that contains one or more types of jobs and the instructions for completing those jobs. For example, in a printing environment, a class may include a type of document to be processed or printed, such as "book", "magazine", "brochure" or other document. Subclasses may include subsets of a job type. For example, if "book" is the selected class, available subclasses may include job types such as "paperback", "hardcover", "pocket size", "oversize" or other categories. As used herein, the term "category" is intended to refer interchangeably to a class subclass or both a class and subclass taken together.

Figure 2:
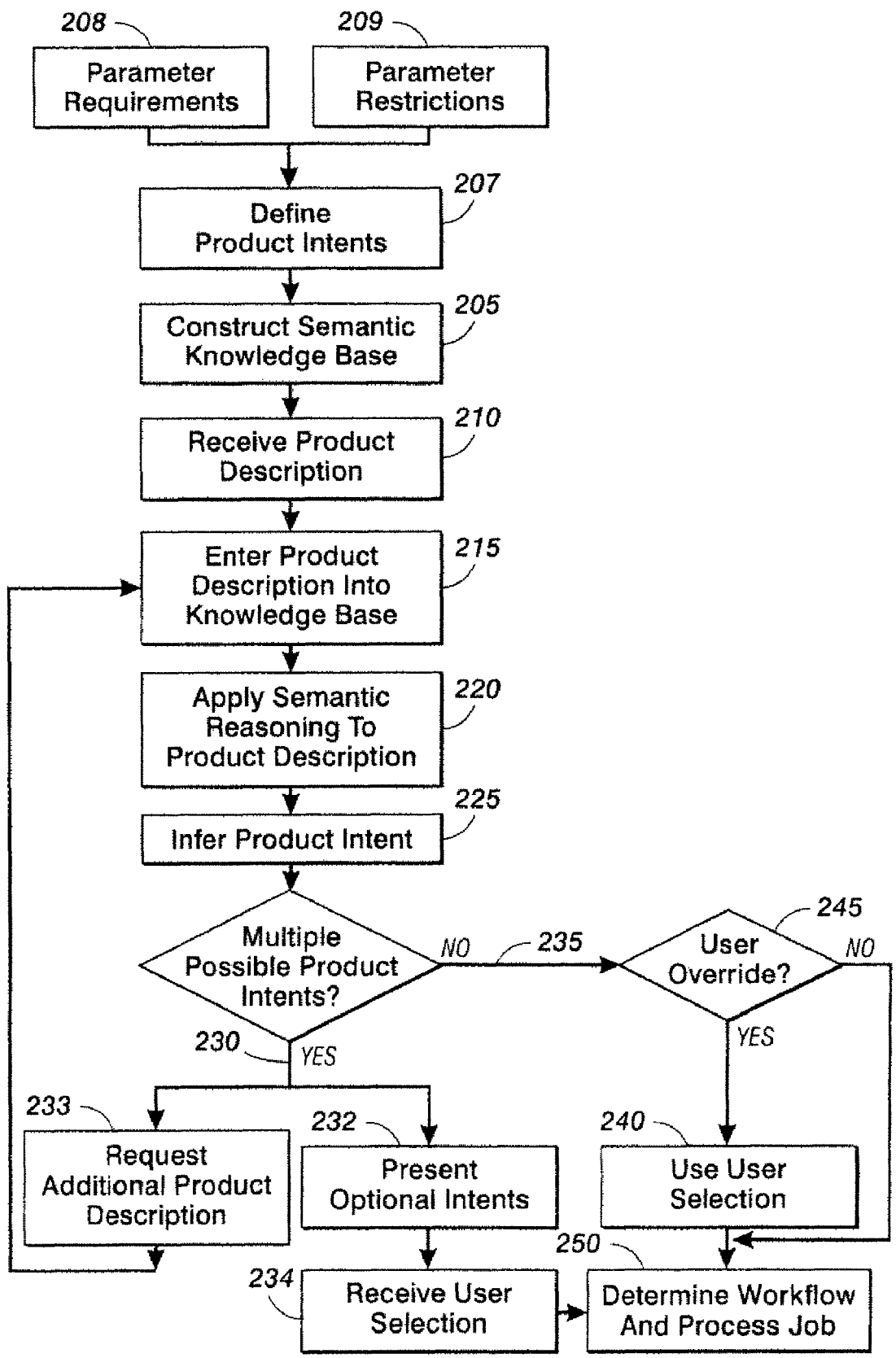
FIG. 2 is a flow diagram of a production environment job classification method.

Referring to FIG. 2, the construction 205 of a semantic knowledge base may include the inclusion of multiple product intents 207 in the knowledge base. A product intent 207 is a data set that includes properties of a particular finished product, and the product intent is used identify a workflow required to produce a document with those properties. For example, in a printing environment, required properties for a product intent may include elements such as one or more of the following, binding type, cover type, folding, print media type and finished size. A product intent may include both parameter requirements 208 and parameter restrictions 209 for a product. A parameter requirement 208 is a parameter that must be included in the product intent (such as a requirement for a particular type of book cover), although it is not limiting in that other parameters—even those that may conflict with the parameter requirement—may be permitted in the finished product. A parameter restriction 209 is a parameter that must be included in the product intent (such as a requirement for a particular page size), and it is restrictive in that it excludes parameters that may conflict with the parameter restriction. In other words, the finished product may not include any elements that conflict with the parameter restriction 209.

Figure 3:
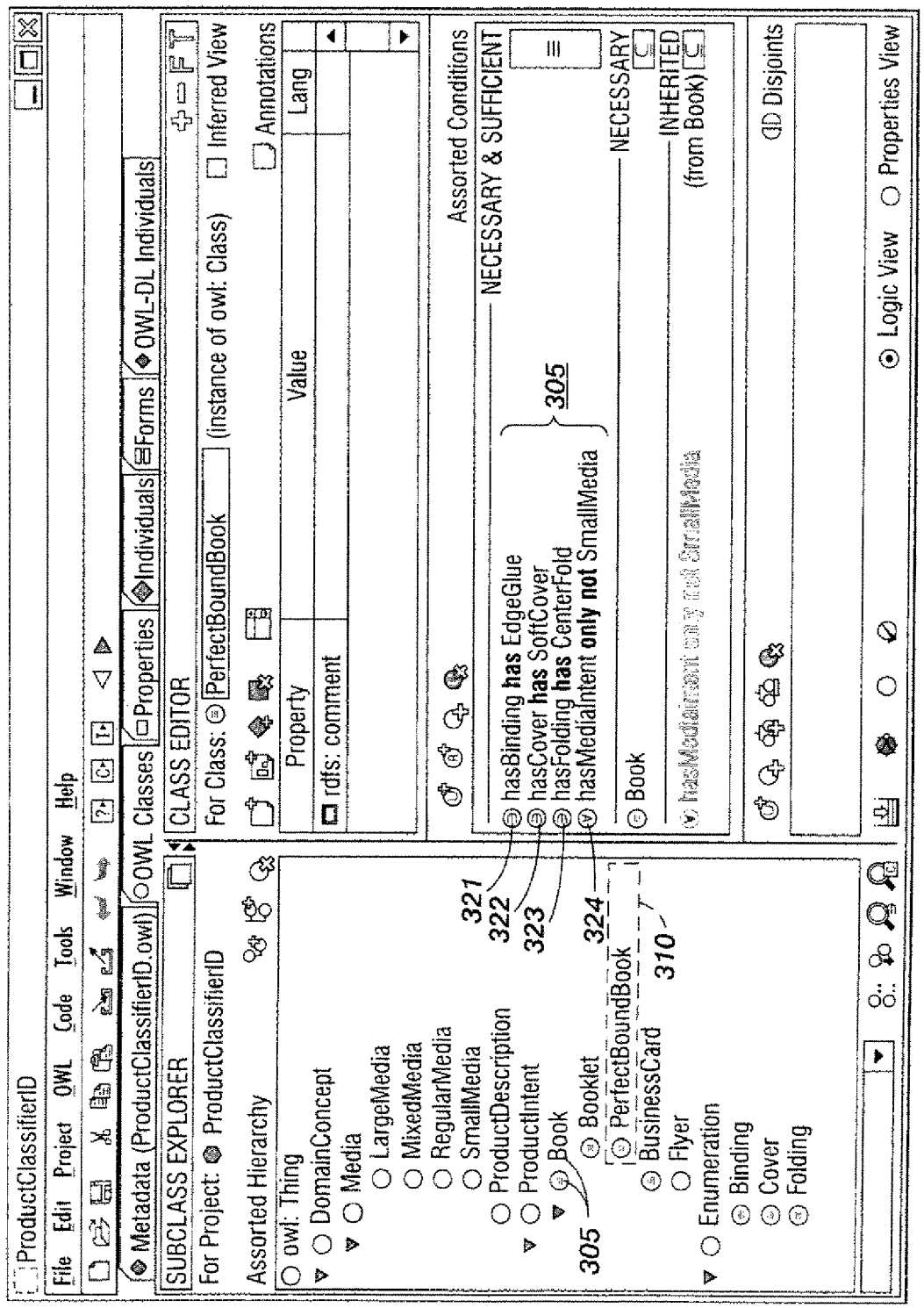
FIG. 3 illustrates a user interface showing exemplary parameters for a first product intent (in particular, a certain type of book) in a print shop.

For example, FIG. 3 is a screen shot from an example of a print shop workstation user interface in which a defined product intent is shown. In FIG. 3, a product intent 305 for the product intent subclass "PerfectBoundBook" 310, which is a specific type of book (and thus a subclass of the general job class "Book" 315), includes: (1) a first parameter 321 requiring that the finished product have a binding of edge glue; (2) a second parameter 322 requiring that the product have a soft cover; (3) a third parameter 323 requiring that the product have a center fold, and (4) a fourth parameter 324 requiring that the media size be anything other than "small" (e.g., something smaller than A4). The use of "has" in the first three parameters 321-323 means that those parameters are parameter requirements, or minimum requirements of the finished product. In other words, in the example of FIG. 3 the finished product must include, at a minimum, the three properties of an edge glue binding, a center fold, and a soft cover. The finished product also may include other properties so long as it includes these three properties. The use of the word "only" in the fourth parameter 324 indicates that the fourth parameter is a restrictive parameter, and the finished product may not include any properties that conflict with that parameter. In other words, in the example of FIG. 3 the finished product may not include any media having a small size. The preceding requirements and restrictions on product intent create a defined product which can be used with logic-based automated reasoners to infer the category of a particular print job.

Figure 4:
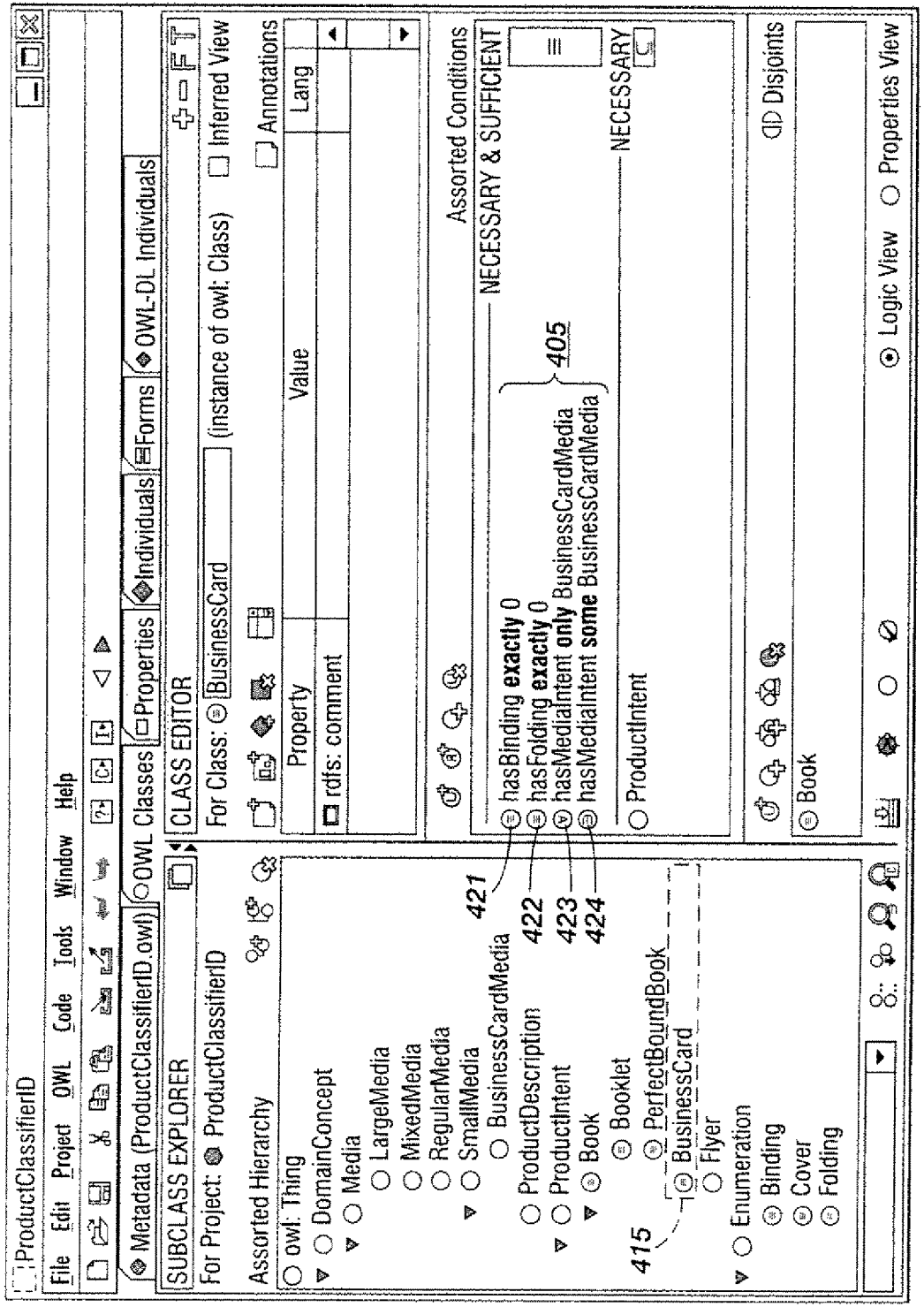
FIG. 4 illustrates a user interface showing exemplary parameters for a second produce intent (in particular, a business card) in a print shop

FIG. 4 is another example of print shop workstation user interface in which a defined product intent is shown. In this case, the finished product is a business card. In FIG. 4, a product intent 405 for the job class "BusinessCard" 415 includes: (1) a first parameter 421 requiring that the finished product have no binding; (2) a second parameter 422 requiring that the product have no folding; (3) a third parameter 423 requiring that the product have only business card media; and (4) a fourth parameter 424 requiring that the media size include some business card media. In this case, all parameters are restrictive in that no parameters may conflict with any of the parameters 421-424. Note that this example's use of both the third parameter 423 requiring that the product have only business card media; and the fourth parameter 424 requiring that the media size include some business card media work together to ensure that a product intent having no specified media intent is not inferred to be a business card. In other words, the fourth parameter requires at least one business card intent, while the third parameter requires that there be no other type of media intent.

Figure 5:
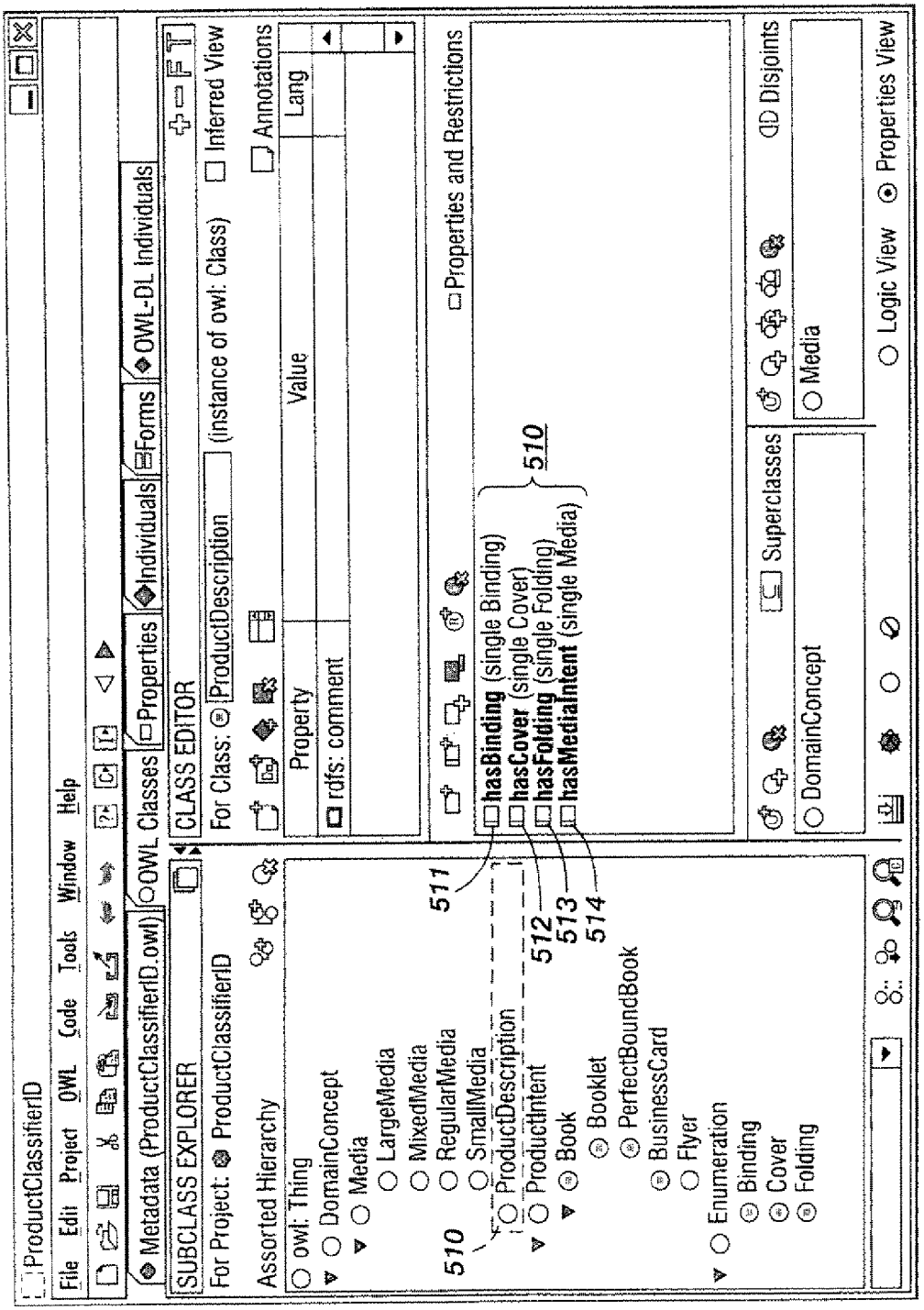
FIG. 5 illustrates a user interface showing exemplary product description parameters received from a user.

Referring again to FIG. 2, the system may receive 210, from a workstation user or other input source, a product description. A product description is a set of two or more parameters of a finished product. For example, referring to FIG. 5, a user interface for a print shop workstation may enable a user to enter a product description 510 including various characteristics of a finished product, such as: (1) a first characteristic 511 requiring that the product have a single type of binding; (2) a second characteristic 512 requiring that the product have a single type of cover; (3) a third characteristic 513 requiring that the product have a single fold type; and (4) a fourth characteristic 514 requiring that the product have a single type of media.

One skilled in the art will recognize that the entry of a product description described above is available in a processing language known as Job Definition Format (JDF), which is a set of processing instructions that describe both printing products and the processes required to create those products in a printing environment. However, product descriptions may be entered in other processing languages, as well as using formats available for other types of production environments.

Figure 6:
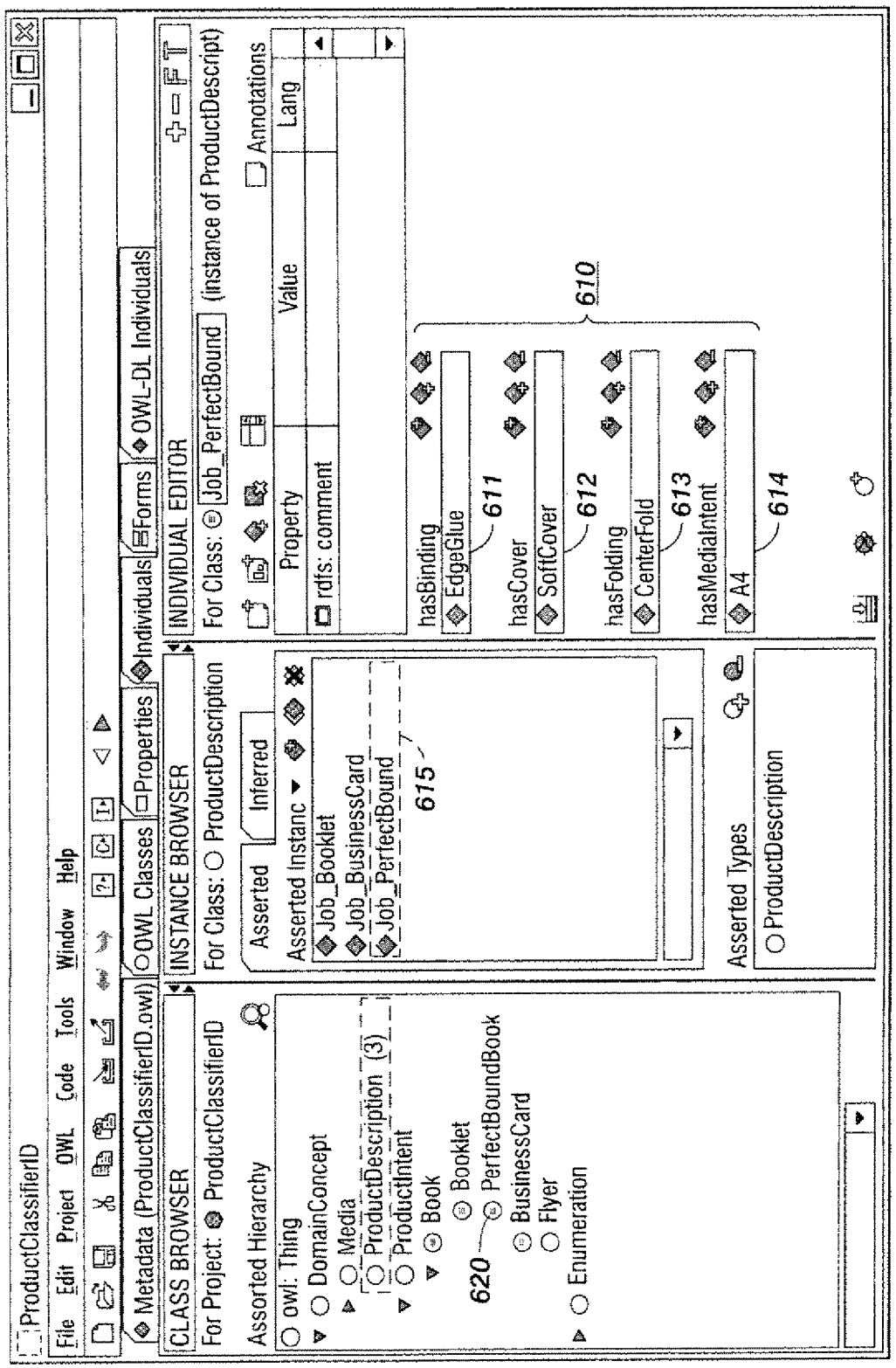
FIG. 6 illustrates a user interface showing an exemplary application of semantic reasoning to a product description.
Figure 7:
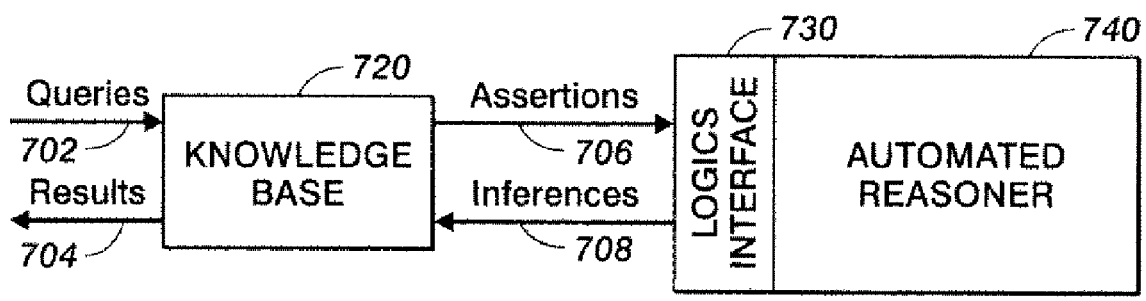
FIG. 7 illustrates exemplary elements of a job classification system.

Referring again to FIG. 2, after the product description is received 210, the product description optionally may be entered into the knowledge base 215. An automated reasoning system may run on the workstation 150 or controller 120 of FIG. 1, or it may run on another device that communicates with the knowledge base 170. An automated reasoning system, sometimes known as a description logic reasoner, is an application (such as a software application) that that executes on the knowledge base which consists of the ontology of defined product intents and instantiated product intent instances (i.e. product descriptions) to determine the instance's product type. Examples of suitable automated reasoning systems include known available systems such as Pellet, Racer, and Fact++, although the invention is not limited to the use of those particular systems, and any now or hereafter known automated reasoning system may be suitable. Referring again to FIG. 2, the automated reasoning system reviews the ontology of product intents and applies semantic reasoning 220 to infer the product intent 225 to which the received product description should be a member. For example, referring to FIG. 6, an automated reasoning system may analyze a product description 610 containing parameters of edge glue binding 611, a soft cover 612, a center fold, and A4 size paper 612. The user who submitted the product description may have given the job a name 615, such as "PerfectBound", although the job name may be incidental to the semantic classification. The reasoner may determine that a job having all such features is a member of the "PerfectBoundBook" job class 620. Although FIG. 6 illustrates the automated reasoning system being invoked via a user interface, in an alternate embodiment the reasoning system may perform its function on a processor, without particular requirement for a user interface. FIG. 7 illustrates that the system may include a knowledge base 720 and automated reasoner 740 that interact through a logic interface 730. The knowledge base may receive queries 702 and deliver corresponding assertions 706 to the automated reasoner 740 via the logics interface 730. The reasoner 740 may return inferences 708 to the knowledge base 720 via the logics interface 730, and the inferences are correlated to results 704, which are delivered from the knowledge base 720.

Referring again to FIG. 2, optionally the reasoner may determine that a received product description is equally likely to be a member of multiple product intents 230. For example, a single set of instructions may fit within each of the categories of "Hard Cover Book," Mixed Color Media," "Urgent Job" and "Packaging Required", which may cause processing conflicts further downstream in the workflow. If so, then the system may present the user with an interface that allows the user to select one of the product intents from each of the candidate (i.e., potential) product intents 232. After the user selects one of the product intents 234, the system may process the job in the production environment using the parameters associated with the selected product intent 250. The customer interface and production shop operations may be eased through automatically determining a workflow plan that can deliver the product desired by the customer. Alternatively (or in addition), the user may be asked to provide additional parameters for the product description 233, so that the system may enter the updated description in the knowledge base 215 and apply semantic reasoning to the updated description to narrow the set of possible product intents.

Alternatively, if the reasoner infers that a single product intent corresponds to the product description, then the system may process the job in the production environment using the inferred product intent 250. Optionally, before such processing, the user may be given the opportunity to override the product intent by revising one or more parameters in the product intent 245. If the user selects the user override option, the user selection is used as the new product intent 240. In either event, the job may then be processed 250 in the production environment using the new product intent.

The processing 250 of the job in the production environment may include using the product intent as a job class and determining a workflow based on the job class. An example of such a workflow assignment method is described in co-pending U.S. patent application Ser. No. 11/121/629, filed May 3, 2005 by Ocke, Shepherd and Goetz, published Nov. 9, 2006 as publication no. US 2006/0253213, the disclosure of which is incorporated herein by reference in its entirety.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of processing a print job in a print shop, comprising:
   in a computer-readable memory, maintaining a semantic knowledge base comprising data in a web ontology form that describes a plurality of product intents, wherein each product intent includes at least one of parameter requirements and parameter restrictions for a finished print job;
   via a user interface, receiving a product description, wherein the product description includes a plurality of desired properties of a proposed print job;
   inferring, by a controller, using a semantic reasoning system, which of the product intents in the semantic knowledge base corresponds to the product description; and
   by the controller, automatically identifying a workflow in a print shop for the proposed print job based on the inferred product intent; and
   by a print engine, processing the proposed print job in the print shop according to the identified workflow;
   wherein:
   for each product intent that includes at least one parameter requirement, the inferring comprises determining that the product intent does not correspond to the product description if the product description does not include each included parameter requirement, and
   for each product intent that includes at least one parameter restriction, the inferring comprises determining that the product intent does not correspond to the product description if the product description includes a parameter that conflicts with any included parameter restriction.

2. The method of claim 1 wherein, if the inferring comprises determining that a plurality of candidate product intents may equally correspond to the product description, the method further includes:
   presenting each of the candidate product intents to a user;
   receiving a selected product intent from the candidate product intents; and
   using the selected product intent as the inferred product intent.

3. The method of claim 1 wherein, if the inferring comprises determining that a plurality of candidate product intents may equally correspond to the product description, the method further includes:
   requesting additional product description from the a user, wherein the product description and additional product description collectively comprise an updated product description; and
   using the semantic reasoning system to infer which of the product intents in the knowledge base most closely corresponds to the updated product description.

4. The method of claim 1 wherein, before automatically identifying a workflow, the method further comprises:
   providing a user with the ability to override the inferred product intent with a user-selected product intent; and
   thereafter using the user-selected product intent as the inferred product intent.

5. The method of claim 1, further comprising entering the received product description in the semantic knowledge base.

6. The method of claim 1, wherein the parameter requirements comprise at least one of the following: binding type, cover type, fold type.

7. The method of claim 1, wherein the parameter restrictions comprise a print media type.

8. A method of processing a job in a production environment, comprising:
   in a computer-readable memory, maintaining a semantic knowledge base comprising data in a web ontology form that describes a plurality of product intents, wherein each product intent includes at least one of parameter requirements and parameter restrictions for producing a finished product;
   via a user interface, receiving a product description, wherein the product description includes a plurality of desired properties of a proposed job;
   inferring, by a controller, using a semantic reasoning system, which of the product intents in the semantic knowledge base corresponds to the product description, wherein:
   for each product intent that includes at least one parameter requirement, the inferring comprises determining that the product intent does not correspond to the product description if the product description does not include each included parameter requirement; and
   for each product intent that includes at least one parameter restriction, the inferring comprises determining that the product intent does not correspond to the product description if the product description includes a parameter that conflicts with any included parameter restriction;
   via the user interface, providing a user with the ability to override the inferred product intent with a user-selected product intent, and if the user overrides the inferred product intent then thereafter using the user-selected product intent as the inferred product intent;

by the controller, automatically identifying a workflow in a production environment for the proposed job based on the inferred product intent; and by the controller, processing the proposed job in the production environment according to the determined workflow to create the finished product.

9. The method of claim 8 wherein, if the inferring comprises determining that a plurality of candidate product intents may equally correspond to the product description, the method further includes:

presenting each of the candidate product intents to the user;

receiving a selected product intent from the candidate product intents; and using the selected product intent as the inferred product intent.

10. The method of claim 8 wherein, if the inferring comprises determining that a plurality of candidate product intents may equally correspond to the product description, the method further includes:

requesting additional product description from the user, wherein the product description and additional product description collectively comprise an updated product description; and using the semantic reasoning system to infer which of the product intents in the knowledge base most closely corresponds to the updated product description.

11. The method of claim 8, wherein:

the job comprises a print job;

the production environment comprises a print ship; and the parameter requirements comprise at least one of the following:

binding type, cover type, fold type.

12. The method of claim 8, wherein the at least one parameter restriction comprises a print media type.

13. A print job classification system, comprising:

a semantic knowledge base comprising a non-transitory computer-readable medium comprising data in a web ontology form that describes a plurality of product intents, wherein each product intent includes at least one of parameter requirements and parameter restrictions for a finished print job;

a workstation comprising an automated automatic semantic reasoner application that, when executed by the workstation, causes the workstation to:

receive a product description, wherein the product description includes a plurality of desired properties of a proposed print job;

access the semantic knowledge base to infer product intents that correspond to the product description; and return a plurality of inferences to determine which of the product intents in the knowledge base corresponds to the product description;

automatically identify a workflow in a print shop for the proposed print job based on the inferred product intent, and issue an order to process the proposed print job in the print shop according to the determined workflow;

wherein:

for each product intent that includes at least one parameter requirement, the inferring comprises determining that the product intent does not correspond to the product description if the product description does not include each included parameter requirement, and for each product intent that includes at least one parameter restriction, the inferring comprises determining that the product intent does not correspond to the product description if the product description includes a parameter that conflicts with any included parameter restriction; and a print shop resource that, in response to the order performs an operation on a document according to the determined workflow.

14. The system of claim 13, wherein the workstation also comprises a user interface, and the automatic semantic reasoner application comprises additional program instructions that, when executed, cause the workstation to:

presenting each of the a plurality of candidate product intents to a user via the user interface;

receiving, from the user via the user interface, a selected product intent from the candidate product intents; and use the selected product intent as the inferred product intent.

15. The system of claim 14, wherein the automatic semantic reasoner also comprises a user interface, and the automatic semantic reasoner application comprises additional program instructions that, when executed, cause the workstation to:

determine whether multiple candidate product intents may correspond to the product description;

in response to determining that multiple candidate product intents may correspond to the product description request, via the user interface, additional product description from the user, wherein the product description and additional product description collectively comprise an updated product description; and infer which of the product intents in the semantic knowledge base most closely corresponds to the updated product description.

16. The system of claim 15, wherein the automatic semantic reasoner application comprises additional program instructions that, when executed, cause the workstation to:

receive, from the user via the user interface, an instruction to override the inferred product intent with a user-selected product intent; and thereafter use the user-selected product intent as the inferred product intent.

17. The system of claim 14, wherein the automatic semantic reasoner application comprises additional program instructions that, when executed, cause the workstation to:

receive, from the user via the user interface, an instruction to override the inferred product intent with a user-selected product intent; and thereafter use the user-selected product intent as the inferred product intent.

* * * * *